(12) United States Patent
Tryfonas

(10) Patent No.: US 7,464,173 B1
(45) Date of Patent: Dec. 9, 2008

(54) METHOD FOR SMOOTHING THE TRANSMISSION OF A MULTIMEDIA FILE HAVING CLOCK RECOVERY RESTRAINTS

(75) Inventor: Christos Tryfonas, Foster City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1017 days.

(21) Appl. No.: 10/354,777

(22) Filed: Jan. 30, 2003

(51) Int. Cl.
G06F 15/16 (2006.01)

(52) U.S. Cl. ............... 709/233; 709/231; 709/232; 709/236

(58) Field of Classification Search ........... 370/395, 370/412, 230; 709/231, 233, 234, 236
See application file for complete search history.

(56) References Cited

U.S. PATENT DOCUMENTS

| 5,526,362 | A * | 6/1996 | Thompson et al. ......... 370/516 |
| 6,233,226 | B1 * | 5/2001 | Gringeri et al. ............ 370/252 |
| 6,778,536 | B1 * | 8/2004 | Ofek et al. ............... 370/395.4 |
| 6,785,236 | B1 * | 8/2004 | Lo et al. ................... 370/235 |
| 6,920,148 | B1 * | 7/2005 | Kato ........................ 370/442 |

OTHER PUBLICATIONS

W. Feng, *Buffering Techniques for Delivery of Compressed Video in Video-on-Demand Systems*, 1997, Kluwer Academic Publishers, Boston/Dordrecht/London (all pages relevant).

(Continued)

Primary Examiner—John Follansbee
Assistant Examiner—Dhairya A Patel

(57) ABSTRACT

The present invention is directed to a method for preparing a transmission schedule that when utilized results in a smooth transmission of a multimedia file and maintains a fixed buffer occupancy at the decoder. According to one embodiment of the invention, a transmission rate is calculated for the transmission of the first frame of the multimedia file that will cause the decoder buffer to be one-half full at the end of the transmission of that frame. This initial transmission rate is stored in the schedule with a time segment starting at zero and ending at the time when the transmission of the first frame is complete. Thereafter, a current time segment is defined starting at the time when the transmission of the first frame is complete and ending when the transmission of the second frame is complete. A transmission rate is calculated for the current time segment that will cause the decoder buffer to be one-half full at the end of the time segment. Next, it is determined whether the transmission rate is feasible for the time segment. If the transmission rate is feasible, then the end time and transmission rate are saved, the time segment is lengthened by increasing the end time, and the method returns to the transmission rate calculation step. If the transmission rate is not feasible, then the current start time, the saved end time, and the saved transmission rate are stored in the transmission rate schedule, and the method returns to the step of determining the current time segment which starts at the stored end time. Finally, when all of the frames have been considered, the current start time, the saved end time and the saved transmission rate are stored in the transmission rate schedule.

18 Claims, 6 Drawing Sheets

OTHER PUBLICATIONS

S.J. Golestani, *A Self-Clocked Fair Queueing Scheme for Broadband Applications*, Proceedings of IEEE Infocom '94, vol. 2, Jun. 1994, pp. 636-646, Morristown, NY.

M. Grossglauser, S. Keshav, and D. Tse, *RCBR: A Simple and Efficient Service for Multiple-Time Scale Traffic*, Proceedings of ACG Sigcomm, vol. 25, Aug. 1995, pp. 219-230, Cambridge, MA.

International Organization for Standardization, *Information Technology—Generic Coding of Moving Pictures and Associated Audio: Systems*, Recommendation H.222.0, ISO/IEC 13818-1, first edition, Apr. 1996, pp. x-xvii, 8-21, 106-116, (place of publication unknown).

International Organization for Standardization, *Information Technology—Generic Coding of Moving Pictures and Associates Audio: Systems*, Recommendation ITU-T H.262, ISO/IEC 13818-2, first edition, May 1996, pp. iv-viii, 155-160, (place of publication unknown).

Z. Jiang and L. Kleinrock, *A General Optimal Video Smoothing Algorithm*, Proceedings of IEEE Infocom '98, vol. 1, 1998, (all pages relevant) (place of publication unknown).

E. W. Knightly, *H-Bind: A New Approach to Providing Statistical Performance Guarantees to VBR Traffic*, Proceedings of the IEEE Infocom, vol. 3, Mar. 1996, San Francisco, CA (all pages relevant).

J.M. McManus and K.W. Ross, *Video-on-Demand Over ATM: Constant-Rate Transmission and Transport*, IEEE Journal on Selected Areas of Communication, vol. 14, Aug. 1996, pp. 1087-1098, (place of publication unknown).

A. K. Parekh and R.G. Gallager, *A Generalized Processor Sharing Approach to Flow Control in Integrated Services Networks: The Single-Node Case*, IEEE/ACM Transactions on Networking, vol. 1, Jun. 1993, pp. 344-357, (place of publication unknown).

A.K. Parekh and R.G. Gallager, *A Generalized Processor Sharing Approach to Flow Control in Integrated Services Networks: The Multiple-Node Case*, IEEE/ACM Transaction on Networking, vol. 2, Apr. 1994, pp. 137-150, (place of publication unknown).

J.D. Salehi, et al., *Supporting Stored Video: Reducing Rate Variability and End-to-End Resource Requirements Through Optimal Smoothing*, Proceedings of ACM Sigmetrics, 1996, (all pages relevant) (place of publication unknown).

D. Stiliadis and A. Varma, *A General Methodology for Designing Efficient Traffic Scheduling and Shaping Algorithms*, Proceedings of IEEE Infocom, Apr. 1997, (all pages relevant) (place of publication unknown).

D. Stiliadis and A. Varma, *Efficient Fair-Queueing Algorithms for Packet-Switched Networks*, IEEE/ACM Transactions on Networking, Apr. 1998, pp. 1-92, (place of publication unknown).

C. Tryfonas, *Video Transport Over Packet-Switched Networks*, PhD Thesis, University of California at Santa Cruz, Mar. 1999, (all pages relevant) (place of publication unknown).

L. Zhang, *VirtualClock: A New Traffic Control Algorithm for Packet-Switched Networks*, ACM Transactions on Computer Systems, vol. 9 (2), May 1991, pp. 101-124, (place of publication unknown).

* cited by examiner

| START TIME | END TIME | TRANSMISSION RATE |
|---|---|---|
| 0 | time $t_{e0}$ | rate $tr_0$ |
| time $t_{s1}$ | time $t_{e1}$ | rate $tr_1$ |
| time $t_{s2}$ | time $t_{e2}$ | rate $tr_2$ |
| | | |
| time $t_{sn}$ | time $t_{en}$ | rate $tr_n$ |

METHOD FOR SMOOTHING THE TRANSMISSION OF A MULTIMEDIA FILE HAVING CLOCK RECOVERY RESTRAINTS

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

In general, this invention relates to the transmission of a multimedia file over a communications network. More specifically, this invention relates to a method for smoothing the transmission of a multimedia file having clock recovery restraints over a communications network.

A communications network facilitates the transfer of information from a sender to a remote receiver. Early networks provided for the transfer of audio information (i.e., voice). Over time, however, the types of information transferred by a communications network evolved to include not only audio but also data, video and images. Increasingly, the information transferred is "multimedia" in that it consists of some combination of audio, video and/or image. In fact, audio/video files currently comprise a large percentage of multimedia files and are expected to be a significant portion of future network traffic. Applications that utilize or intend to utilize the transmission of multimedia files include video-on-demand and the "web casting" of television programs.

There are several factors that make the transfer of a multimedia file more difficult than transferring other types of network communications. For example, in many circumstances, the transfer of multimedia information over a network is "time-sensitive" in that the information must be received within a certain time period in order to be effectively utilized or reproduced. Consider the transmission of a file that includes both data and video information to a receiver who will view the video as it is being sent. The video file or portion of a file comprises a series of still images or frames that if displayed rapidly (e.g., at least 30 frames per second for broadcast quality video) in sequence result in a completely fluid picture. If the display rate is slow, however, then the display device will not be able to display the images rapidly enough and the result is a poor quality, erratic picture. Thus, when the receiver receives a multimedia file having a video portion, the receiver must process a number of frames within a small time period in order to display a fluid picture.

Another factor that makes the transfer of multimedia files difficult is the large size of many multimedia files and the relatively high rate at which the frames must be displayed. More specifically, these characteristics make the transmission of most multimedia files bandwidth intensive. For example, an uncompressed, broadcast quality video typically requires between 90 Mbps (megabits per second) to 270 Mbps of bandwidth for a successful transmission. Even when compressed, a video stream may require between 1.5 Mbps and 9 Mbps of bandwidth. Moreover, the size of the frames may vary greatly which causes the bandwidth required at a particular time to vary. Thus, for a compressed video stream, a communication network utilized to transfer the stream must have at least 9 Mbps (approximately) of bandwidth available, although the entire reserved bandwidth may not be fully utilized at any specific time.

There is yet another factor that influences the transmission of a multimedia file. During a transmission, the frames of a multimedia file typically are received in the buffer of a stream decoder where the frames are stored before being decoded and sent to other devices, such as a display device. Decoder buffers have a limited size, so if the frames arrive too quickly there is a risk that the buffer will be full of frames waiting to be decoded. In this case, the decoder will have no place to store the incoming frames, and the frames will be lost. Conversely, if the frames arrive too slowly, then the buffer will be emptied of frames before new frames arrive causing the decoder to be idle until new frames arrive.

The transmission of a multimedia file is further complicated when the sender and receiver must have synchronized clocks. Consider the transmission of a multimedia file containing both audio and video information. When the file is received, the audio and video portions of the file are separated and sent to the devices that will render the information (e.g., the video portion may be sent to a monitor and the audio portion may be sent to an amplifier). Both the audio and video portions of the file will contain timing, or clock, information so that the corresponding portions of the file may be rendered at the same time. The receiver's system must recover this clock information and then synchronize that information with its own clock in order to insure that the two portions of the file are effectively produced. The transmission of a television signal over a network is one example of a transmission with clock recovery restraints.

Several simple methods exist for transferring a multimedia file. One method involves finding the bandwidth required to transfer the largest frame in the file and then reserving that bandwidth for the time required to transfer the entire file. This method insures that the bandwidth needed to transfer the largest frame is continually available. The method, however, is inefficient because the entire reserved bandwidth is not utilized during significant portions of the transfer. Another method of transferring a multimedia file would be to reserve only the bandwidth necessary for a particular frame at the time when that frame is scheduled to be transferred. This method is also inefficient in that every frame might require a different bandwidth and, therefore, the method would be constantly changing the reserved bandwidth, which may increase the cost of the transmission to an unacceptable level.

To reduce the high variability of bandwidth demanded and improve efficiency, a multimedia transmission may be "smoothed." Generally, smoothing seeks to maximize the time intervals at which a reserved rate and/or transmission rate are used without causing the decoder's buffer to overflow or underflow. For example, consider a five-frame stream in which the first frame requires a transmission rate of 1 Mbps, the second frame requires 0.5 Mbps, the third frame requires 1 Mbps, the fourth frame requires 4 Mbps, and the fifth frame requires 5 Mbps for an acceptable transmission. Instead of scheduling an initial reserved rate of 1 Mbps with four changes, one after each frame is transmitted, or scheduling a reserved rate of 5 Mbps for the entire transmission, a smoothed transmission might request an initial reserved rate of 1 Mbps and then one change to 5 Mbps after the third frame is transmitted. Although the smoothed transmission would have excess reserved bandwidth during the transmission of the second frame and the fourth frame, this excess is significantly less than the method that reserves the maximum bandwidth required. Also, the smoothed method has only one change in reserved rate compared to four changes in the method requiring a separate reserved rate for each frame. The smoothed transmission, therefore, is both feasible and more efficient than the methods described above.

Even more so than other multimedia files, the transmission of a file that has a stringent clock specification requires careful consideration. First, as stated above, existing smoothing methods seek to maximize the time intervals at which a transmission rate is used without causing the decoder buffer to underflow or overflow. FIG. 1 shows an example of the amount of data received at the decoder buffer, represented by solid line 10, when a current smoothing method is employed. (The dotted line designated by the numeral 20 indicates the buffer's overflow boundary, and the dotted line designated by the numeral 30 indicates the buffer's underflow boundary. So long as the amount of data received at the decoder remains between dotted lines 20 and 30, the stream decoder's buffer will not overflow or underflow.) It is apparent from FIG. 1 that existing smoothing methods force the decoder buffer to almost underflow after almost overflowing and vice versa. This characteristic has an impact on the recovery of clock information as shown in FIG. 2, wherein solid line 40 represents the clock frequency recovered from the transmission smoothed by the example method. From FIG. 2 it is apparent that the clock frequency recovered by existing smoothing methods could be more stable.

It has been discovered that the clock recovery process is facilitated if a fixed buffer occupancy at the decoder is maintained. In FIG. 3, solid line 50 represents the amount of data received at a decoder buffer when a smoothing method that maintains the decoder buffer at one-half status is employed. (Consistent with FIG. 2, in FIG. 3 the dotted line designated by the numeral 60 indicates the buffer's overflow boundary and the dotted line designated by the numeral 70 indicates the buffer's underflow boundary.) When such a smoothing method is utilized, the clock frequency recovered is shown by the solid line 80 in FIG. 4. Comparing line 40 in FIG. 2 with line 80 in FIG. 4 clearly shows the advantage of a smoothing method that maintains a fixed buffer occupancy.

Therefore, it is desirable to provide a method for smoothing the transmission of a multimedia file that facilitates the clock recovery process. More specifically, it is desirable to provide a method for transmitting a multimedia file that smooths the transmission of a multimedia file while maintaining a fixed buffer occupancy at the decoder. It is further desirable to provide a method for determining a schedule for the transmission of a multimedia file that when implemented results in a smooth transmission and facilitates clock recovery at the receiver by maintaining a fixed buffer occupancy at the decoder. Additional advantages and novel features of the invention will be set forth in the description which follows, and in part will become apparent to those skilled in the art upon examination of the following, or may be learned from practice of the invention.

BRIEF SUMMARY OF THE INVENTION

The present invention provides a method for determining a schedule for the transmission of a multimedia file that when implemented results in a smooth transmission and facilitates clock recovery at the receiver by maintaining a fixed buffer occupancy at the decoder. In one embodiment, the schedule includes at least one time segment, which has a start time and an end time, and a corresponding transmission rate. According to the method, a transmission rate is calculated for the transmission of the first frame of the multimedia file that will cause the decoder buffer to be one-half full at the end of the transmission of that frame. This initial transmission rate is stored in the schedule with a time segment starting at zero and ending at the time when the transmission of the first frame is complete. Thereafter, a current time segment is defined starting at the time when the transmission of the first frame is complete and ending when the transmission of the second frame is complete. A transmission rate is calculated for the current time segment that will cause the decoder buffer to be one-half full at the end of the time segment. Next, it is determined whether the transmission rate is feasible for the time segment. If the transmission rate is feasible, then the end time and transmission rate are saved, the time segment is lengthened by increasing the end time, and the method returns to the transmission rate calculation step. If the transmission rate is not feasible, then the current start time, the saved end time, and the saved transmission rate are stored in the transmission rate schedule, and the method returns to the step of determining the current time segment which starts at the stored end time. Finally, when all of the frames have been considered, the current start time, the saved end time and the saved transmission rate are stored in the transmission rate schedule.

BRIEF DESCRIPTION OF THE DRAWINGS

The present invention is described in detail below with reference to the attached drawing figures, wherein.

DETAILED DESCRIPTION OF THE INVENTION

The present invention includes a method for preparing a schedule for the transmission of a multimedia file that when utilized results in a smooth transmission and facilitates clock recovery. The method recognizes that clock recovery is simplified when the decoder buffer is maintained at a fixed occupancy. The method seeks to maximize the time segment for which a transmission rate that causes the decoder buffer to have a fixed occupancy at the end of the time segment may be used without causing the decoder's buffer to overflow or underflow.

Figure 1:
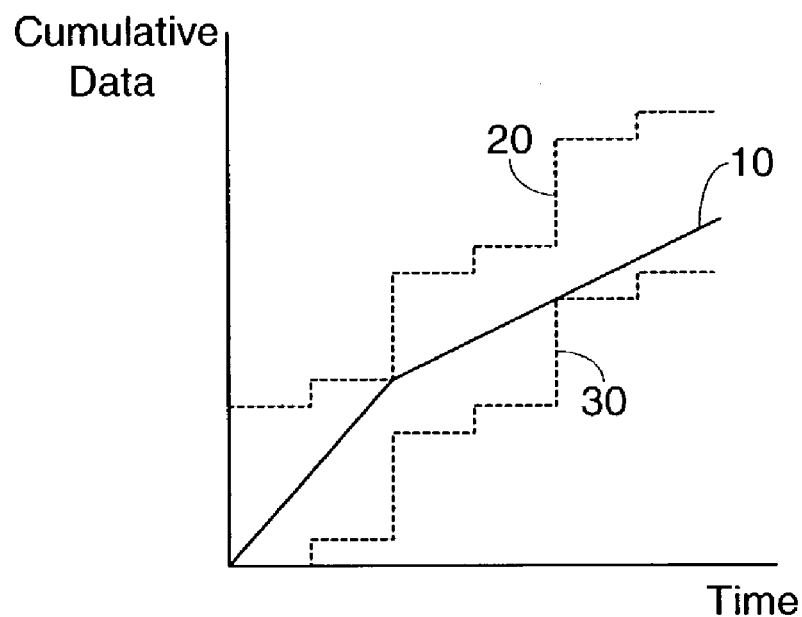
FIG. 1 is a graph of cumulative data received by a stream decoder as a function of time showing an overflow boundary, an underflow boundary and the amount of data received at a decoder buffer when a current smoothing method is employed.
Figure 2:
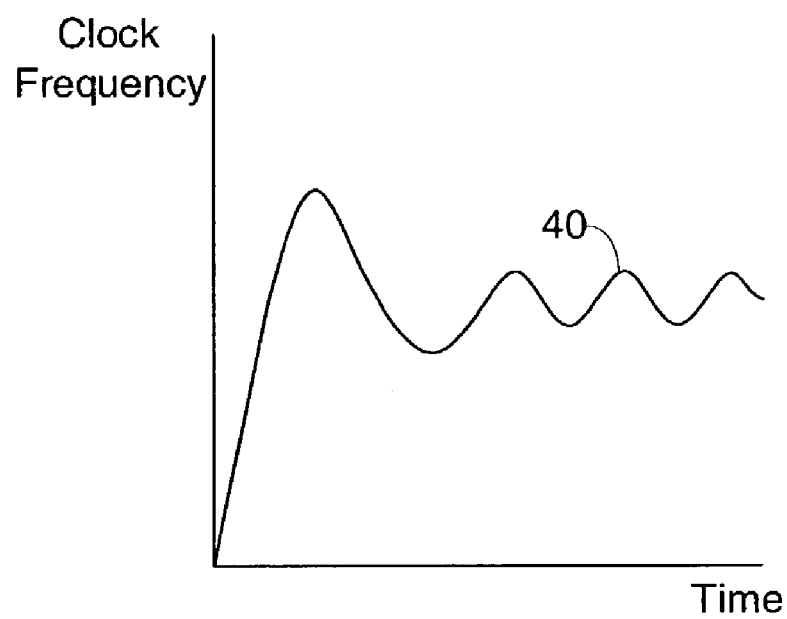
FIG. 2 is a graph of clock frequency as a function of time showing the clock recovered from a transmission smoothed by existing methods.
Figure 3:
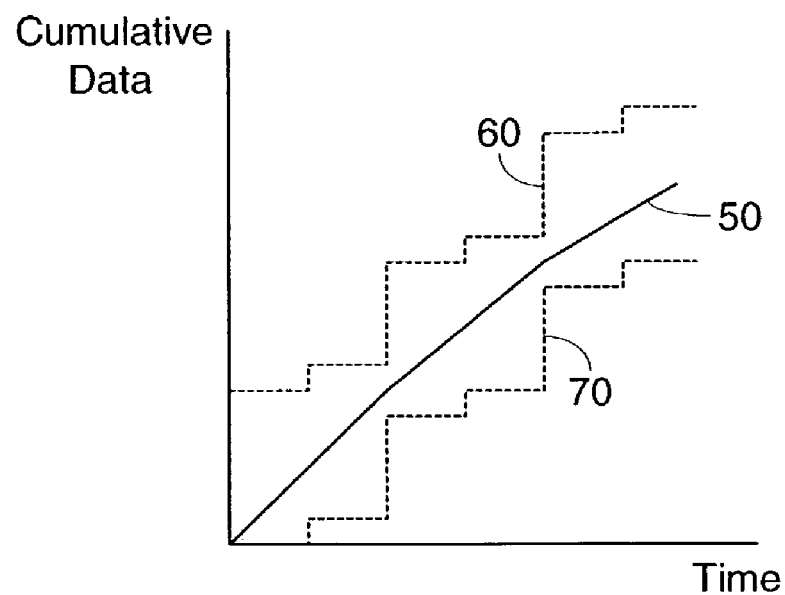
FIG. 3 is a graph of cumulative data received by a stream decoder as a function of time showing an overflow boundary, an underflow boundary and the amount of data received at a decoder buffer when a smoothing method according to one embodiment of the present invention is employed.
Figure 4:
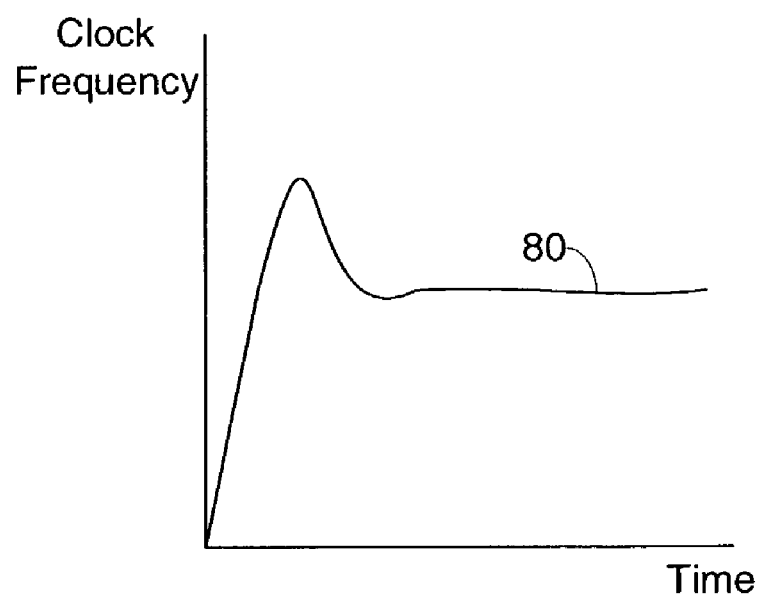
FIG. 4 is a graph of clock frequency as a function of time showing the clock recovered from a transmission smoothed by method according to one embodiment of the present invention.
Figures 5, 6:
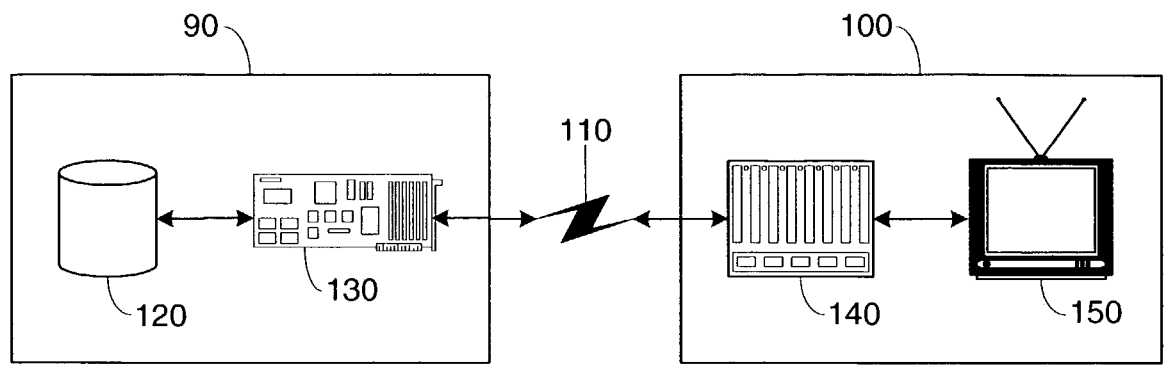
FIG. 5 depicts an environment in which the present invention may be employed.
FIG. 6 depicts one embodiment of a transmission schedule prepared in accordance with the present invention.

The present invention will produce a schedule for the transmission of a multimedia file over a communications network. For the purpose of illustration, and not limitation, one environment in which such a transmission could occur is depicted generally in FIG. 5. In FIG. 5, a sender system 90 is coupled to a receiver system 100 through communications link 110. Sender 90 contains a storage device 120 coupled to a network interface 130. Storage device 90 may be a video server, a hard drive, a CD-ROM, or other device capable of storing a multimedia file. Network interface 130 may be a network card or other hardware device, or may be a software module. Receiver 100 contains a stream decoder 140 coupled to a display device 150 which may be, for example, a computer monitor or a television. Stream decoder 140 may be a software module, such as Microsoft's Windows Media player, or may be a hardware device. Stream decoder 140 includes or has access to a buffer for storing incoming frames. It should be understood that a single device may have both sending and receiving apparatus. Finally, although only a single sender system and a single receiver system are shown in FIG. 5, it should be understood that this invention is not limited to such environments. Instead, the present invention may be employed in environments containing multiple sender systems and multiple receiver systems.

As stated above, sender 90 is coupled to receiver 100 through communications link 110. It should be understood that communications link 110 represents a logical link which may or may not be a direct connection. Communications link 110 will be formed through a communications network. It should be understood that this network may contain a number of devices including, but not limited to, routers, repeaters, network adapters, network cards, servers, bridges, gateways, cables, wires, wireless transmitters and receivers, fiber optic cables and hardware, and telephone lines. It should also be understood the network is not limited in size, that is, the network may be, without limitation, a local area network, a wide-area network, a metropolitan-area network, or the Internet.

In operation, typically, a multimedia file is stored on storage device 120 in sender 90. The transmission of the multimedia file to receiver 100 begins when sender 90 receives an instruction or request to transfer the file. Thereafter, storage device 120 starts sending the frames of the multimedia file to network interface 130 in a sequential fashion. After receiving the frames, network interface 130 transmits the frames at a predetermined transmission rate. Network interface 130 continues to receive and transfer frames until the final frame of the file has been transferred.

After being transmitted from network interface 130, the frames are routed to stream decoder 140 over communications link 110. It should be understood that the frames are not received instantaneously at stream decoder 140. Instead, the frames arrive after a non-zero communications delay which may be caused in part by a propagation delay. It should be understood that the presence of a communications delay does not impact the various embodiments of the invention described below.

At receiver 100, the frames are received by stream decoder 140 and stored in a buffer. If frames arrive at stream decoder 140 too quickly, the buffer will fill and the arriving frames will be lost. This is called overflow. Similarly, if frames arrive too slowly, stream decoder 140 will decode and transfer all of the information in the buffer before another frame is received. As a consequence, stream decoder 140 will be idle until another frame is received. This is called underflow. Thus, a feasible transmission is one in which the decoder buffer does not overflow or underflow. After receiving a frame from the buffer, stream decoder 140 decodes the information and passes the frame to display device 150 where it will be displayed. Display device 150 may begin to display frames before a file's final frames are sent by storage device 120 to network interface 130.

The method for determining a schedule for the smooth transmission of a multimedia file is employed for an individual file. Ordinarily the method is employed for a file that was previously stored on a storage device, such as a storage device 120. The method, however, could be employed for a file being generated in real-time. For a real-time application, the frames would be stored for a short time on storage device 120, and the method would execute for the portion of the file so stored before it is sent to network interface 130.

One embodiment of a transmission schedule prepared in accordance with the present invention is shown in FIG. 6. In FIG. 6, a time segment consisting of a start time ($t_S$) and an end time ($t_E$) is associated with a transmission rate (tr) in a table. Thus, start time $t_{S1}$ and end time $t_{E1}$ are associated with transmission rate $tr_1$ and so on until start time $t_{Sn}$ and end time $t_{En}$ are associated with transmission rate $tr_n$. In use, a multimedia file is transmitted at transmission rate $tr_1$ from time $t_{S1}$ to time $t_{E1}$, at transmission rate $tr_2$ from time $t_{S2}$ to time $t_{E2}$, and so on. In another embodiment, the transmission schedule may include only a start time and an associated transmission rate. In this embodiment, it would be understood that the start time for a particular transmission rate also would be the end time for the previous transmission rate. Other data structures may also be utilized and are included in the scope of this invention.

Figure 7A:
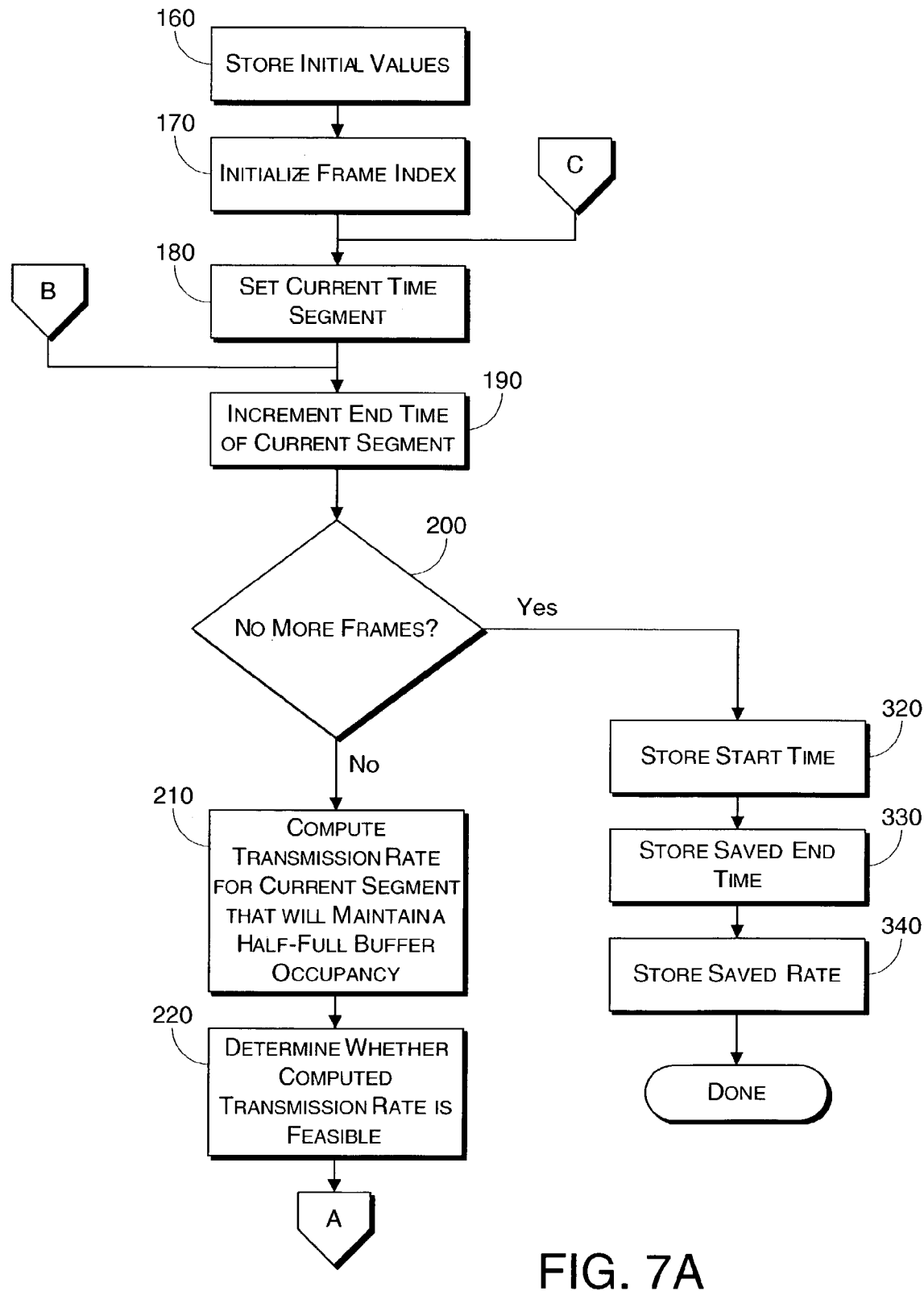
FIG. 7A is a flowchart illustrating one embodiment of a method for creating a transmission rate schedule according to the present invention.
Figure 7B:
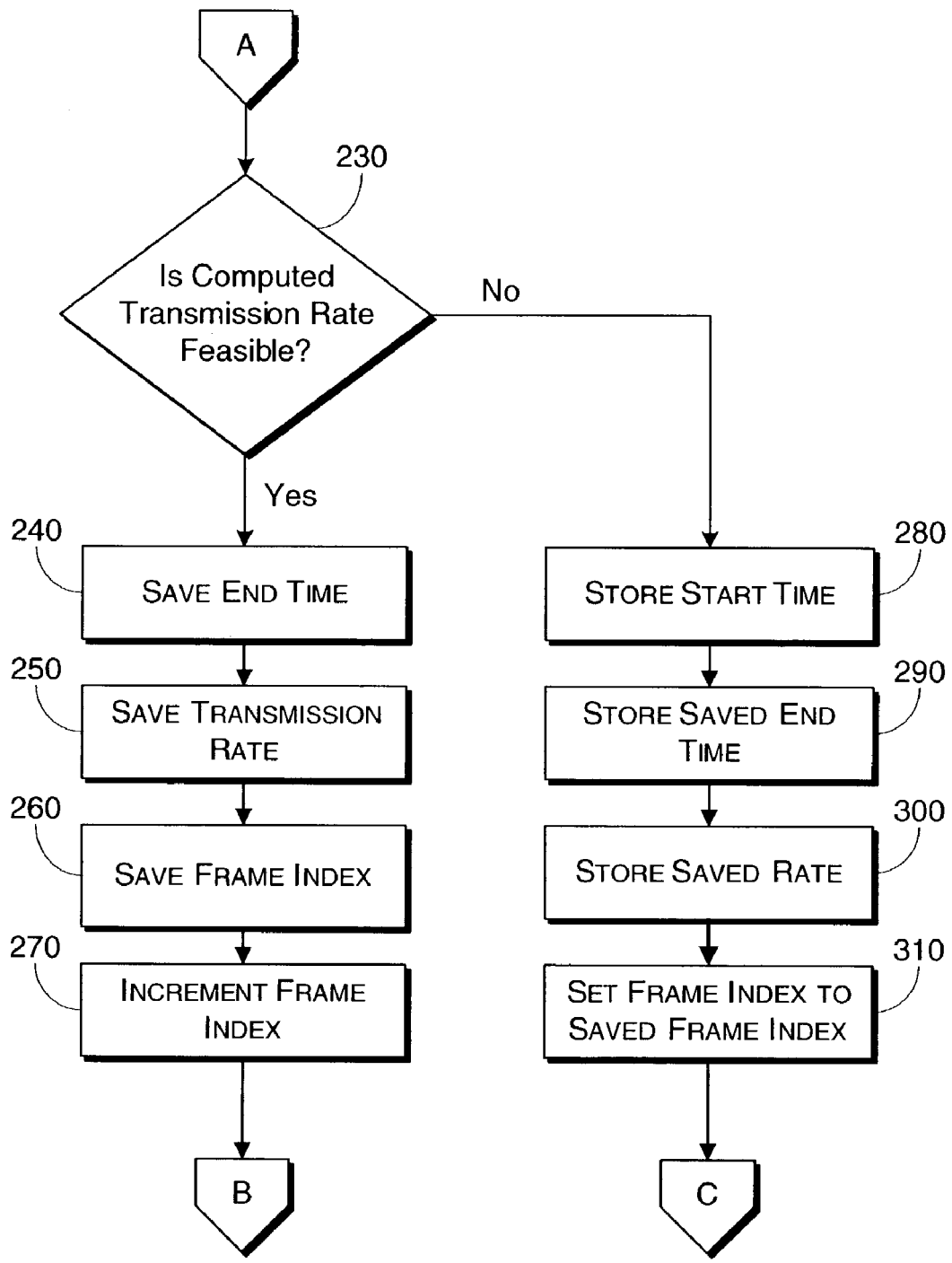
FIG. 7B is a continuation of the flowchart begun in FIG. 7A.

Referring now to FIGS. 7A and 7B, a flowchart illustrating the steps for determining a transmission schedule for a multimedia file having clock restraints according to one embodiment of the present invention is shown. In this embodiment, the method is set to maintain the decoder buffer at one-half occupancy. It should be understood that a schedule determined according to the present invention may be used whenever the corresponding file is to be sent to a receiver with the same or greater buffer size as the buffer used to determine the schedule. However, the schedule will be optimal only if it is used to transmit a file to a buffer with the same size as used to determine the schedule. A separate schedule is required for a receiver that has a smaller buffer size.

The method begins at box 160 in FIG. 7A where several initial values are stored in the transmission schedule. First, an initial time segment is stored. This initial time segment starts at time zero and ends at the time required to transmit the first frame which is equal to the inverse of the frame rate. Next, an initial transmission rate that is equal to the rate required to make the decoder buffer one-half full at the end of the transmission of the first frame is stored. In one embodiment, this transmission rate may be found using the following equation:

$$tr_0 = \frac{C_N(1/f) + B_D/2}{1/f} \quad (1)$$

where f is the frame rate for the multimedia file, $C_N(1/f)$ is equal to the cumulative amount of data consumed by the decoder at time 1/f, and $B_D$ equals the size of the decoder buffer. It should be understood that the frame rate is an indication of how often frames must be consumed by the decoder, that is, the decoder must consume a frame every 1/f seconds.

The method continues at box 170 where the frame index is initialized. Basically, "frame index" is a variable that is used to count frames. Thus, at any given time during the operation of the method, the value of the frame index variable is equal to the number of the frame being considered. In box 170, the frame index is set to one.

At box 180, the current time segment is set. In this embodiment, the start time of the current segment is set to the frame index divided by the frame rate and the end time of the current time segment is set to equal the start time.

At box 190, the end time of the current segment is incremented by adding the inverse of the frame rate to the current end time.

At box 200, the method asks whether there are more frames in the file or, in other words, whether all of the file's frames have been considered. In one embodiment, the answer to this question is determined by finding whether the current frame index is equal to the number of frames in the file plus one.

If the answer at box 200 is "No," then at box 210, a transmission rate for the current time segment that will maintain the buffer occupancy at one-half at the end of the time segment is computed. In one embodiment, the transmission rate (tr) is found using the following equation:

$$tr = \frac{C_N(t_E) - C_N(t_S)}{t_E - t_S} \quad (2)$$

where $t_E$ is the current end time, $t_S$ is the current start time, $C_N(t_E)$ is the cumulative amount of data that has arrived at the decoder buffer as of the current end time, and $C_N(t_S)$ is the cumulative amount of data that has arrived at the decoder buffer as of the current start time.

In box 220, the method determines whether the transmission rate found in box 210 is feasible. In order for a transmission rate to be feasible, the decoder's buffer cannot overflow or underflow during the current time segment.

The method continues at box 230 in FIG. 7B where the question of whether the transmission rate is feasible is asked. If the answer to the question in box 230 is "Yes," the method continues at box 240 where the current end time is saved. Next, at box 250, the current transmission rate is saved, and, at box 260, the frame index is saved. It should be understood that the values saved in boxes 240 through 260 are not stored in the transmission schedule, but, instead are saved in a different memory structure for future reference.

In box 270, the frame index is incremented, that is, the frame index is increased by one. The method then returns to box 190 in FIG. 7A where the end time of the current time segment is incremented. In this manner, the time segment is lengthened because the end time is increased while the start time remains the same.

If at box 230 in FIG. 7B the answer is "No," that is the computed transmission rate is not feasible, then the method continues at box 280 where the current start time is stored in the transmission schedule. Next, at box 290, the end time saved by the method in the preceding iteration of the method (at box 240) is stored in the transmission schedule. At box 300, the transmission rate saved in the preceding iteration of the method (at box 250) is stored in the transmission schedule. The current start time and the saved end time comprise the time segment for the transmission rate saved at box 300. At box 310, the frame index is set to the frame index saved in the previous iteration of the method (at box 260). Following box 310, the method returns to box 180 in FIG. 7A where a new current time segment is set. Because the frame index has been reset to the saved frame index value, the new current time segment will start at the end time of the time segment stored in the transmission schedule.

If at box 200 the answer is "Yes," that is if there are no more frames to consider, then the method proceeds to box 320. At box 320, the current start time is stored in the transmission schedule. At box 330, the end time saved in the preceding iteration of the method (at box 240) is stored in the transmission schedule. Finally, at box 340, the transmission rate saved in the preceding iteration of the method (at box 250) is stored in the transmission schedule. Following box 340, the method is complete.

Figure 8:
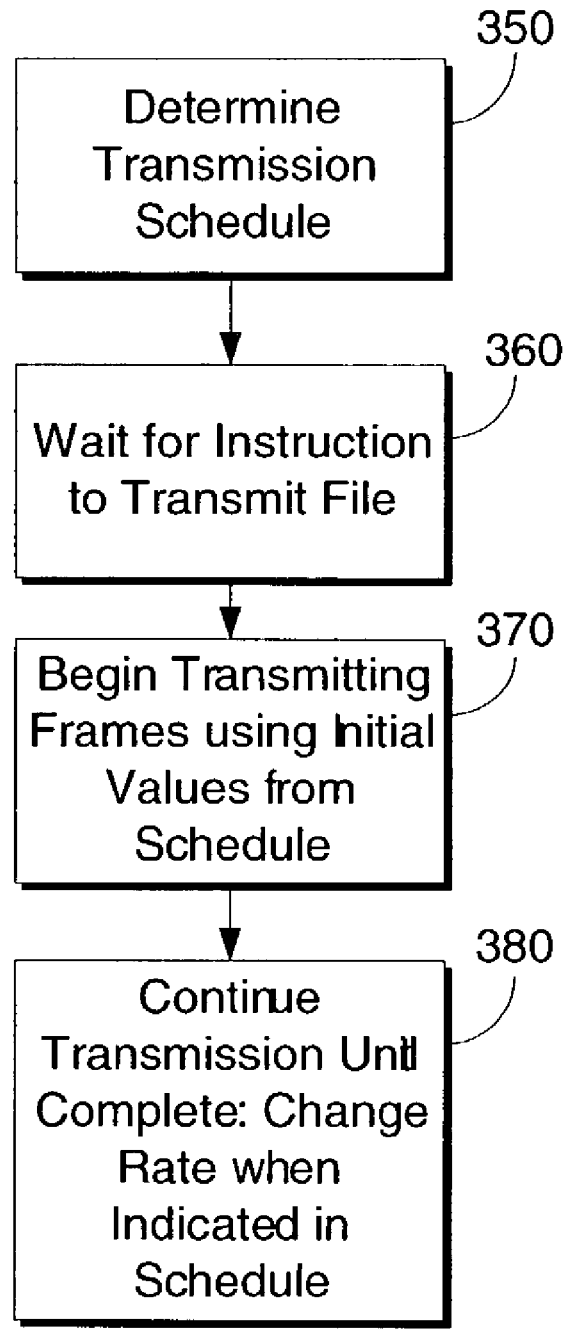
FIG. 8 is a flowchart illustrating a method for smoothing the transmission of a time-sensitive file in accordance with the present invention.

FIG. 8 depicts the steps involved smoothing the transmission of a time-sensitive file in accordance with the present invention. First, at box 350, a transmission schedule for a file is determined as discussed above. If there is only one possible type of stream decoder that will receive the stream, then only one transmission schedule is required. If, however, there is more than one possible type of stream decoder, then a transmission schedule is determined for each type. Next, in box 360, the sending system waits for an instruction to transmit the file. When a transmit instruction is received, the sending system, at box 370, begins to transmit the file using the transmission schedule appropriate for the receiver's stream decoder. The sending system begins the transmission utilizing the initial rates in the transmission rate schedule. Thereafter, at box 380, the system continues the transmission until it is complete. During the transmission, at the times indicated in the transmission schedule, the sender changes the transmission rate to the rate associated with the particular time segment.

As one skilled in the art will appreciate, the present invention may also be embodied as a computer-program product that includes computer-useable instructions embodied on a computer-readable medium. Computer-readable media contemplates media readable by a database, a switch, and various other network devices and may comprise computer-storage media and communications media. Computer-storage media include media implemented in any method or technology for storing information including, but are not limited to: RAM, ROM, EEPROM, flash memory or other memory technology, CD-ROM, Digital Versatile Disks (DVD), holographic media or other optical disk storage, magnetic cassettes, magnetic tape, magnetic disk storage, and other magnetic storage devices. Communications media typically embody computer-useable instructions—including data structures and program modules—in a modulated data signal. By way of example, but not limitation, communication media include wired media, such as a wired network or direct-wired connection, and wireless media such as acoustic, infrared, radio, microwave, spread-spectrum, and other wireless media technologies. Combinations of the above are included within the scope of computer-readable media.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and within the scope of the claims.

What is claimed is:

1. A method for preparing a schedule for transmitting a multimedia file from a sender to a receiver over a network, said schedule providing at least one time segment and a corresponding transmission rate, said time segment having a start time and an end time, said multimedia file including plurality of frames, said receiver including a buffer for receiving said frames and a display device, said method comprising the steps of:

determining an initial transmission rate to transmit a first frame of the file such that the receiver's buffer will have a predetermined occupancy when a transmission duration equals a frame-transmit time, wherein a duration required to transmit one frame of a multimedia file that will be displayed at a predetermined frame rate;

storing in said schedule said initial transmission rate with a corresponding initial time segment having a start time equal to zero and an end time equal to frame transmit time;

determining a current time segment beginning at a current start time and ending at a current end time;

setting said current start time equal to said frame-transmit time;

setting said current end time equal to said current start time increased by said frame-transmit time;

computing a transmission rate for said current time segment wherein at said current end time said buffer has predetermined proportion of said buffer's occupancy filled, wherein said predetermined proportion is determined prior to preparing said schedule for said transmission and wherein further said proportion is one-half full;

determining whether said transmission rate is feasible;

if said transmission rate is feasible, then saving said current end time and said transmission rate, increasing said current time segment by adding a frame transmit time to said current end time, and repeating the aforementioned steps;

but if said transmission rate is not feasible, then storing said current start time, said saved end time, and said saved transmission rate in said schedule, setting a current time segment having a current start time equal to said saved end time and a current end time equal to said saved end time increased by a frame-transmit time, and repeating said aforementioned steps.

2. A method as set forth in claim 1 further including between said step of setting said current end time and said step of computing a transmission rate the steps of determining whether said current end time is greater than a file transmit time, said file transmit time being equal to the number of frames in the file multiplied by the frame transmit time, and, if said current end time is greater than said file transmit time, then storing said current start time, said saved end time, and said saved transmission rate in said schedule, and concluding said method.

3. A method as set forth in claim 1 wherein said step of determining whether said transmission rate is feasible includes the step of determining whether transmitting said file at said transmission rate during said current time segment will cause said buffer to overflow as well as determining whether transmitting said file at said transmission rate would cause said buffer to underflow.

4. A computer system for preparing a schedule for transmitting a multimedia file from a sender to a receiver over a network, said schedule providing at least one time segment and a corresponding transmission rate, said time segment having a start time and end time, said multimedia file including a plurality of frames, said receiver including a buffer for receiving said frames a display device, said system comprising a processor operable to execute the following steps:

determining an initial transmission rate to transmit a first frame of the file such that the receiver's buffer will have a predetermined occupancy when a transmission duration equals a frame-transmit time, wherein a duration required to transmit one frame of a multimedia file that will be displayed at a predetermined frame rate;

storing in said schedule said initial transmission rate with a corresponding initial time segment having a start time equal to zero and an end time equal to frame transmit time;

determining a current time segment beginning at a current start time and ending at a current end time;

setting said current start time equal to said frame-transmit time;

setting said current end time equal to said current start time increased by said frame-transmit time;

computing a transmission rate for said current time segment wherein at said current end time said buffer has predetermined proportion of said buffer's occupancy filled, wherein said predetermined proportion is determined prior to preparing said schedule for said transmission and wherein further said proportion is one-half full;

determining whether said transmission rate is feasible;

if said transmission rate is feasible, then saving said current end time and said transmission rate, increasing said current time segment by adding a frame transmit time to said current end time, and repeating the aforementioned steps;

but if said transmission rate is not feasible, then storing said current start time, said saved end time, and said saved transmission rate in said schedule, setting a current time segment having a current start time equal to said saved end time and a current end time equal to said saved end time increased by a frame-transmit time, and repeating said aforementioned steps.

5. A system as set forth in claim 4 wherein said processor is further operable to execute the steps of determining whether said current end time is greater than a file transmit time, said file transmit time being equal to the number of frames in the file multiplied by the frame transmit time, and, if said current end time is greater than said file transmit time, then storing said current start time, said saved end time, and said saved transmission rate in said schedule, and concluding said method.

6. A system as set forth in claim 4 wherein said step of determining whether said transmission rate is feasible includes the step of determining whether transmitting said file at said transmission rate during said current time segment will cause said buffer to overflow as well as determining whether transmitting said file at said transmission rate would cause said buffer to underflow.

7. A computer-readable storage medium having computer readable code embodied thereon for causing the preparation of a schedule for transmitting a file from a sender to a receiver over a network, said schedule providing at least one time segment and a corresponding transmission rate, said time segment having a start time and an end time, said multimedia file including a plurality of frames, said receiver including a buffer for receiving said frames and a display device, said computer readable code comprising instructions that cause a computer to:

determining an initial transmission rate to transmit a first frame of the file such that the receiver's buffer will have a predetermined occupancy when a transmission duration equals a frame-transmit time, wherein a duration required to transmit one frame of a multimedia file that will be displayed at a predetermined frame rate;

storing in said schedule said initial transmission rate with a corresponding initial time segment having a start time equal to zero and an end time equal to frame transmit time;

determining a current time segment beginning at a current start time and ending at a current end time;

setting said current start time equal to said frame-transmit time;

setting said current end time equal to said current start time increased by said frame-transmit time;

computing a transmission rate for said current time segment wherein at said current end time said buffer has predetermined proportion of said buffer's occupancy filled, wherein said predetermined proportion is determined prior to preparing said schedule for said transmission and wherein further said proportion is one-half full;

determining whether said transmission rate is feasible;

if said transmission rate is feasible, then saving said current end time and said transmission rate, increasing said current time segment by adding a frame transmit time to said current end time, and repeating the aforementioned steps;

but if said transmission rate is not feasible, then storing said current start time, said saved end time, and said saved transmission rate in said schedule, setting a current time segment having a current start time equal to said saved end time and a current end time equal to said saved end time increased by a frame-transmit time, and repeating said aforementioned steps.

8. A computer-readable storage medium as set forth in claim 7 wherein said computer readable code further comprises instructions that cause a computer to determine whether said current end time is greater than a file transmit time, said file transmit time being equal to the number of frames in the file multiplied by the frame transmit time, and, if said current end time is greater than said file transmit time, then store said current start time, said saved end time, and said saved transmission rate in said schedule, and conclude said method.

9. A computer-readable storage medium as set forth in claim 7 wherein said instruction causing a computer to determine whether said transmission rate is feasible includes instructions that cause a computer to determine whether transmitting said file at said transmission rate during said current time segment will cause said buffer to overflow as well as determining whether transmitting said file at said transmission rate would cause said buffer to underflow.

10. A method for preparing a schedule for transmitting a multimedia file from a sender to a receiver over a network, said schedule providing at least one time segment and a corresponding transmission rate, said time segment having a start time and an end time, said multimedia file including a plurality of frames, said receiving including a buffer for receiving said frames and a display device, said method comprising the steps of:

setting a frame index to one;

determining an initial transmission rate to transmit a first frame of the file such that the receiver's buffer will have a predetermined occupancy when a transmission duration equals a frame-transmit time, wherein a duration required to transmit one frame of a multimedia file that will be displayed at a predetermined frame rate;

storing in said schedule said initial transmission rate with a corresponding initial time segment having a start time equal to zero and an end time equal to frame transmit time;

determining a current time segment beginning at a current start time and ending at a current end time;

setting said current start time equal to said frame-transmit time;

setting said current end time equal to said current start time increased by said frame-transmit time;

computing a transmission rate for said current time segment wherein at said current end time said buffer has predetermined proportion of said buffer's occupancy filled, wherein said predetermined proportion is determined prior to preparing said schedule for said transmission and wherein further said proportion is one-half full;

determining whether said transmission rate is feasible;

if said transmission rate is feasible, then saving said current end time and said transmission rate, increasing said current time segment by adding a frame transmit time to said current end time, and repeating the aforementioned steps;

but if said transmission rate is not feasible, then storing said current start time, said saved end time, and said saved transmission rate in said schedule, setting a current time segment having a current start time equal to said saved end time and a current end time equal to said saved end time increased by a frame-transmit time, and repeating said aforementioned steps.

11. A method as set forth in claim 10 further including between said step of setting said current end time and said step of computing a transmission rate the steps of determining whether said frame index is greater than the number of frames in said file, and, if said frame index is greater than the number of frame in said file then storing said current start time, said saved end time, and said saved transmission rate in said schedule, and concluding said method.

12. A method as set forth in claim 10 wherein said step of determining whether said transmission rate is feasible includes the step of determining whether transmitting said file at said transmission rate during said current time segment will cause said buffer to overflow as well as determining whether transmitting said file at said transmission rate would cause said buffer to underflow.

13. A computer system for preparing a schedule for transmitting a multimedia file from a sender to a receiver over a network, said schedule providing at least one time segment and a corresponding transmission rate, said time segment having a start time and end time, said multimedia file including a plurality of frames, said receiver including a buffer for receiving said frames a display device, said system comprising a processor operable to execute the following steps:

setting a frame index to one;

determining an initial transmission rate to transmit a first frame of the file such that the receiver's buffer will have a predetermined occupancy when a transmission duration equals a frame-transmit time, wherein a duration required to transmit one frame of a multimedia file that will be displayed at a predetermined frame rate;

storing in said schedule said initial transmission rate with a corresponding initial time segment having a start time equal to zero and an end time equal to frame transmit time;

determining a current time segment beginning at a current start time and ending at a current end time;

setting said current start time equal to said frame-transmit time;

setting said current end time equal to said current start time increased by said frame-transmit time;

computing a transmission rate for said current time segment wherein at said current end time said buffer has predetermined proportion of said buffer's occupancy filled, wherein said predetermined proportion is determined prior to preparing said schedule for said transmission and wherein further said proportion is one-half full;

determining whether said transmission rate is feasible;

if said transmission rate is feasible, then saving said current end time and said transmission rate, increasing said current time segment by adding a frame transmit time to said current end time, and repeating the aforementioned steps;

but if said transmission rate is not feasible, then storing said current start time, said saved end time, and said saved transmission rate in said schedule, setting a current time segment having a current start time equal to said saved end time and a current end time equal to said saved end time increased by a frame-transmit time, and repeating said aforementioned steps.

14. A system as set forth in claim 13 wherein said processor is further operable to perform, between said step of setting said current end time and said step of computing a transmission rate, the steps of determining whether said frame index is greater than the number of frames in said file, and, if said frame index is greater than the number of frame in said file then storing said current start time, said saved end time, and said saved transmission rate in said schedule, and concluding said method.

15. A system as set forth in claim 13 wherein said step of determining whether said transmission rate is feasible includes the step of determining whether transmitting said file at said transmission rate during said current time segment will cause said buffer to overflow as well as determining whether transmitting said file at said transmission rate would causes said buffer to underflow.

16. A computer-readable storage medium having computer readable code embodied thereon for causing the preparation of a schedule for transmitting a file from a sender to a receiver over a network, said schedule providing at least one time segment and a corresponding transmission rate, said time segment having a start time and an end time, said multimedia file including a plurality of frames, said receiver including a buffer for receiving said frames and a display device, said computer readable code comprising instructions that cause a computer to:

set a frame index to one;

determining an initial transmission rate to transmit a first frame of the file such that the receiver's buffer will have a predetermined occupancy when a transmission duration equals a frame-transmit time, wherein a duration required to transmit one frame of a multimedia file that will be displayed at a predetermined frame rate;

storing in said schedule said initial transmission rate with a corresponding initial time segment having a start time equal to zero and an end time equal to frame transmit time;

determining a current time segment beginning at a current start time and ending at a current end time;

setting said current start time equal to said frame-transmit time;

setting said current end time equal to said current start time increased by said frame-transmit time;

computing a transmission rate for said current time segment wherein at said current end time said buffer has predetermined proportion of said buffer's occupancy filled, wherein said predetermined proportion is determined prior to preparing said schedule for said transmission and wherein further said proportion is one-half full;

determining whether said transmission rate is feasible;

if said transmission rate is feasible, then saving said current end time and said transmission rate, increasing said current time segment by adding a frame transmit time to said current end time, and repeating the aforementioned steps;

but if said transmission rate is not feasible, then storing said current start time, said saved end time, and said saved transmission rate in said schedule, setting a current time segment having a current start time equal to said saved end time and a current end time equal to said saved end time increased by a frame-transmit time, and repeating said aforementioned steps.

17. A computer-readable storage medium as set forth in claim 16 further including instructions that cause a computer to determine whether said frame index is greater than the number of frames in said file, if said frame index is greater than the number of frame in said file then store said current start time, said saved end time, and said transmission rate in said schedule, said conclude said method.

18. A computer-readable storage medium as set forth in claim 16 wherein said instruction for causing a computer to determine whether said transmission rate is feasible includes instructions that cause a computer to determine whether transmitting said file at said transmission rate during said current time segment will cause said buffer to overflow as well as determining whether transmitting said file at said transmission rate would cause said buffer underflow.

* * * * *